United States Patent Office 3,519,405
Patented July 7, 1970

3,519,405
COMPOSITE REFRACTORY STRUCTURE
Emanuel Gordon, New Haven, Conn., assignor to United Nuclear Corporation, a corporation of Delaware
Filed Feb. 1, 1966, Ser. No. 525,281
Int. Cl. B22f 7/04
U.S. Cl. 29—182.3     2 Claims

ABSTRACT OF THE DISCLOSURE

A composite light refractory structure is formed by diffusion bonding particles with a core of alumina or beryllia and a thin surface coating of tungsten. The volume fraction of the tungsten coating is less than about 0.20, and the density of the refractory structure is above 58% of the theoretical density.

---

This invention relates to a composite lightweight refractory structure and the method for making the same. The refractory structure of this invention comprises a plurality of integrally bonded particles each of which comprises a core of a lightweight refractory compound and a thin surface coating thereon of a metal having a melting point above about 2000° C. The volume fraction of the coating metal preferably is less than about 0.20, and the particles are bonded to each other by diffusion of their surface coatings to form a refractory structure with a density above about 58% of the theoretical density. This structure has high compressive strength, low thermal conductivity, and excellent oxidation resistance at extremely elevated temperatures. The unique combination of these properties make the refractory structure of this invention a prime candidate for space and aeronautic applications.

The demand for lightweight structure for aerospace application which has a low thermal conductivity and will maintain its structural integrity at elevated temperatures has led to the developement of honeycomb panels made of high melting point metals such as molybdenum and niobium alloys. These panels are produced by methods generally involving complicated manufacturing procedures and oftentimes the metals than can be used are limited to a number of less desirable metals. Economical utilization of some of the metals that are more desirable, such as tungsten, has not been found to be feasible. The honeycomb panels thus produced have inherent limitations. For example, the porosity of the panel which effectively reduces the density and simultaneously lowers the thermal conductivity of the panel adversely affects the physical strength of the panel. Therefore, the degree of porosity that can be incorporated into a honeycomb panel is limited by the minimum required physical strength of the panel. This and other limitations of the honeycomb panel, coupled with the manufacturing difficulties, have limited the application and commercial utilization of this type of structure.

I have now found that a lightweight structure that has a superior physical strength combined with low density and thermal conductivity can be produced simply and economically according to the method of this invention. Broadly stated, the lightweight structure of this invention is produced by first preparing a plurality of particles each of which comprises a core of a refractory compound and a thin surface coating thereon of a metal having a melting point above about 2000° C. The volume fraction of the coating metal preferably is less than 0.20. The particles are then bonded at a presure and a temperature for a period sufficient to cause diffusion bonding of the metal coating to form an integral structure having a density above about 58% of the theoretical density.

The resultant lightweight structure has, in addition to the properties described above, a superior oxidation resistance at elevated temperatures as compared to the conventional hollow honeycomb structure. While the exact nature of the oxidation reaction at elevated temperatures is not completely understood, the higher oxidation resistance of the present invention is probably due to the refractory core which when exposed essentially retards the oxidation of the structure. This is contrary to a conventional honeycomb structure in which the deterioration of the metal structure by oxidation is maintained substantially at the same rate.

A number of high melting point metals, whether they are in a pure state or in the form of alloys, are suitable for the present invention. Preferably, the melting point of the metal is above about 2000° C. Generally, metals with a melting point below 2000° C. will not fully receive the benefit of this invention. Metal suitable for this invention should be able to be deposited on the lightweight refractory particles conveniently and readily to provide a thin layer of a metal coating thereon. The deposition of metal on the particles may be by conventional methods. For example, the coating may be accomplished by a vapor deposition in vacuum or it may be accomplished by the gaseous coating method based on the decomposition of gaseous organometals such as metal carbonyl. Other methods that are suitable include deposition by chemical reaction in a liquid bath. Among the high melting point metals, I found hafnium, iridium, molybdenum, niobium, tantalum, tungsten, and their alloys to be eminently suitable.

The lightweight refractory compound that is suitable may be in the form of an oxide, a nitride, or a silicide. Generally, this refractory compound should have a melting point above about 2000° C. and a density below 5.5 g./cc. at room temperature preferably below 4 g./cc. The refractory compound must have high compressive strength and good oxidation resistance. Among suitable refractory compounds, I found aluminum oxide and beryllium oxide to be particularly suitable.

In the coating process, the amount of coating metals deposited on the surface of the refractory particles can be varied depending on the final physical properties desired. The coating, however, should not exceed 20% the total volume of the coated particles. It has been found that using coating metal much above this volume fraction will not provide in the final product the desired density, the necessary low thermal conductivity, and high oxidation resistance. In general, the thickness of the metal coating should be much less than the diameter of the refractory particles.

The coated refractory particles are hot pressed at a temperature and pressure for a period sufficient to cause a diffusion bonding of adjacent surface coatings. The temperature, pressure, and time of interrelated variables are dependent on the particular type of surface coating metal and the density of the final product desired. The temperature used must be sufficiently high to promote diffusion of the metal at a reasonable time but below the incipient fusion temperature of the metal. Similarly, the pressure used is in the range that will provide a density in the final product with the required physical strength. I found pressure below the level that will provide a product of 58% density is grossly inadequate. The resultant product produced under this pressure will not have the required physical strength. The holding period during the hot press can vary within a wide range. Usually, it should be sufficiently long to allow the complete diffusion of the metal coatings.

Further to illustrate this invention specific examples are described hereinbelow with reference to the accompanying drawings wherein:

FIG. 1 is a photomicrograph (250×) of a hot pressed W–Al₂O₃ panel showing the diffussion bonding between two tungsten coated aluminum oxide particles;

FIG. 2 is a photomicrograph (13×) of a hot pressed W–Al₂O₃ panel with a 91.7% density showing a typical microstructure; and FIG. 3 is a cross section of a laminated structure showing one embodiment of the present invention.

TABLE 2.—LIGHTWEIGHT W–Al₂O₃ PANELS (UNCLAD MECHANICAL PROPERTIES
Compression Tests

| Specimen W–Al₂O₃ | Height, in. | Area, in.[2] | Density,[1] percent Theoretical | Compressive Strength, p.s.i. | Strength Weight Ratio, in |
|---|---|---|---|---|---|
| C | 0.200 | 0.279 | 92.5 | 76,702 | 453,857 |
| D | 0.200 | 0.386 | 92.0 | 41,700 | 248,214 |
| E | 0.300 | 0.391 | 75.0 | 12,672 | 92,496 |

[1] Theoretical density = 5.03 g./cm.³

TABLE 3—THERMAL CONDUCTIVITY OF HONEYCOMB STRUCTURES AT 2,500° k.

| Structure | $V_w$ | $V_{BeO}$ | $V_p$ | $k_{eff}$, cal./sec.-cm.-deg. | $k_T$, cal./sec.-cm.-deg. |
|---|---|---|---|---|---|
| 1. Hollow ⅛-in. tungsten spheres, evacuated | 0.0727 |  | 0.9273 | 0.00812 | 0.0242 |
| 2. Standard ⅛-in. tungsten honeycomb, evacuated | 0.0727 |  | 0.9273 | 0.00812 | 0.0242 |
| 3. Standard ¼-in. tungsten honeycomb, evacuated | 0.0727 |  | 0.9273 | 0.016 | 0.032 |
| 4. Standard ½-in. tungsten honeycomb, evacuated | 0.0727 |  | 0.9273 | 0.032 | 0.0463 |
| 5. Tungsten-coated BeO sphere structure, 100% dense | 0.0727 | 0.9273 |  |  | 0.045 |
| 6. Tungsten-coated Al₂O₃ sphere structure, 100% dense |  |  |  |  | [1] 0.023 |
| 7. Tungsten-coated BeO sphere structure, 58% dense, extrapolated |  |  |  |  | 0.030 |
| 8. Tungsten-coated Al₂O₃ sphere structure, 58% dense, extrapolated |  |  |  |  | [2] 0.16 |

[1] At 2,200° K.
[2] At 2,200° K.

NOTES.—$V_w$=Volume fraction of tungsten; $V_{BeO}$=Volume fraction of BeO; $V_p$=Volume fraction of void space; $k_{eff}$=Effective thermal conductivity due to radiation; $k_T$=Total thermal conductivity.

In this specific example, Al₂O₃ was used as the refractory compound, and W was used as the coating metal. The ⅛″ diameter Al₂O₃ spheres used in this experiment were coated with 40 microns thick of tungsten (equivalent to 7.27 volume percent W) by vapor deposition. The coated spheres were placed in a suitable press and hot pressed into flat panels about 1¾″ in diameter and of variable thickness. The pressure and temperature were varied to show the effect of these variables on the resultant panels. They were varied in a range between 500 to 5000 p.s.i. and from 1600 to 2075° C., respectively. After cooling, the geometric densities of each panel were determined and compression tests were performed on selected specimens. The data obtained is listed in Tables 1 and 2. The metallographies showing the diffusion bonding and the microstructure are shown in FIGS. 1 and 2, respectively, of the accompanying drawings.

Table 1 lists the panel specimens prepared by hot pressing along with the pressing variables used and the resulting geometric densities. As can be seen, the resulting density is a direct function of pressure, temperature, and hold time. The densities obtained ranged from 58% to 95% of theoretical.

Table 2 contains the results of compression tests on sections of the hot pressed panels. This table also lists the strength-to-weight ratios obtained for the specimens tested.

For the purpose of comparison, thermal conductivity calculations were made for the panel of this invention as well as for a hollow sphere honeycomb type structure and the standard honeycomb type structure. The results of this analysis are tabulated in Table 3.

TABLE 1.—LIGHTWEIGHT W–Al₂O₃ PANELS—SPECIMEN FABRICATION (HOT PRESSING)

| Specimen W–Al₂O₃ | Pressure, p.s.i. | Temp., ° C. | Hold Time, min. | Density, g./cm.³ | Density,[1] percent Theoretical |
|---|---|---|---|---|---|
| 1 | 5,000 | 1,975 | 15 | 4.57 | 90.0 |
| 2 | 5,000 | 2,025 | 15 | 4.53 | 89.2 |
| 3 | 5,000 | 2,075 | 15 | 4.69 | 92.5 |
| 4 | 5,000 | 2,035 | 15 | 4.59 | 90.4 |
| 5 | 5,000 | 1,940 | 10 | 4.10 | 82.0 |
| 6 | 5,000 | 2,050 | 15 | 4.80 | 95.0 |
| 7 | 1,666 | 1,925 | 15 | 3.81 | 75.0 |
| 8 | 5,000 | 1,975 | 15 | 4.36 | 86.0 |
| 9 | 1,800 | 1,600 | 5 | 2.94 | 58.0 |
| 10 | 5,000 | 1,950 | 3 | 3.76 | 74.0 |

[1] Theoretical density = 5.08 g./cm.³

For the case of the hollow sphere and the standard honeycomb structures, thermal radiation is a major process at high temperatures. The effective thermal conductivity due to radiation was determined by applying the following equation:

$$k_{eff} = 4E\sigma T^3 d_p$$

where $k_{eff}$ = effective thermal conductivity due to radiation
E = total emissivity
$\sigma$ = Stefan-Boltzmann constant
T = temperature
$d_p$ = void space size The total conductivity of these structures was calculated by applying the following equation:

$$k_T = V_s k_s + V_p(k_g + k_{eff})$$

where $k_T$ = total thermal conductivity
$V_s$ = volume fraction of metal
$k_s$ = thermal conductivity of metal
$V_p$ = volume fraction of void space
$k_g$ = thermal conductivity of gas in void space (for vacuum $k_g = 0$)

for the case of the filled sphere structure, the thermal conductivity was calculated by applying the following equation:

$$k_T = \frac{k_1 k_2}{V_1 k_2 + V_2 k_1}$$

where $k_T$ = total thermal conductivity
$k_1$ = thermal conductivity of metal
$k_2$ = thermal conductivity of refractory oxide
$V_1$ = volume fraction of metal
$V_2$ = volume fraction of refractory oxide The theoretical and measured densities of the standard honeycomb panel and hollow sphere honeycomb panel with those of the panel of this invention are tabulated in Table 4 for the purpose of comparison. The standard honeycomb structures listed in this table are equivalent to the ⅛″ coated sphere structure of this invention on the basis of volume percent of metal percent. Therefore, the theoretical densities of the standard honeycomb are equal to that of the ⅛″ hollow sphere structure.

TABLE 4.—DENSITIES OF HONEYCOMB-LIKE STRUCTURES

| Structure | Theoretical Density, lb./in.³ | Measured Density,[1] Extrapolated, lb./in.³ | Measured Density,[2] lb./in.³ | Density of BeO, lb./in.³ |
|---|---|---|---|---|
| 1.... ⅛-in. cell size x 0.0049 in. foil.. | 0.05 | 0.03 | | |
| 2.... ³⁄₁₆-in. cell size x 0.0068 in. foil.. | 0.05 | 0.02 | | |
| 3.... ¼-in. cell size x 0.009 in foil.... | 0.05 | 0.035 | | |
| 4.... ⅛-in. hollow tungsten sphere... | 0.05 | | | |
| 5.... ⅛-in. W-coated Al₂O₃ sphere... | 0.183 | | | |
| A | | | 0.167 | 0.137 |
| B | | | 0.160 | 0.131 |
| C | | | 0.169 | 0.138 |
| D | | | 0.168 | 0.138 |
| E | | | 0.137 | 0.112 |
| F | | | 0.135 | 0.110 |
| G | | | 0.016 | 0.087 |
| 6.... ⅛-in. W-coated BeO sphere... | 0.150 | | | |

[1] These data are derived from standard Diffusion Bonded Honeycomb Sandwich Panels by North American Aviation, Inc.
[2] These are the measured densities of Al₂O₃ filled spheres. By replacing Al₂O₃ with BeO, an 18% decrease of these values should be obtained.

As can be seen from the above examples, the structures of this invention can be fabricated in a wide range of densities by simple alterations of pressure, temperature, and hold time. It is advantageous at times to make several thin layers of different densities and place them together and bond them into one coherent body as shown in FIG. 3. As illustrated in this drawing, a 58% density panel is laminated with two 95% density panels to form a laminated composite lightweight structure.

As indicated by the examples illustrated above, the lightweight structure of this invention has the capability of withstanding extremely high compressive stress when compared to a hollow honeycomb structure. Furthermore, this property is isotropic. The strength-to-weight ratios of this panel are extremely high. From a strength-to-weight ratio basis this metal is superior to a tungsten honeycomb panel containing the same volume fraction of metal. Considering the property of heat conduction, a 58% theoretical density W–Al₂O₃ structure would have a thermal conductivity 0.016 cal./sec.-cm. degree at 2200° K., which makes this structure a better insulator than a hollow tungsten honeycomb panel of equal metal volume fraction.

If it is desirable to clad these panels with a high melting point metal, for example, tungsten, several cladding methods can be used. They are:

(1) Brazing tungsten sheet to the hot pressed panel.
(2) Hot pressing a sandwich of tungsten powder—tungsten-coated spheres—tungsten powder.
(3) Diffusion bonding tungsten sheet to the hot pressed panel.
(4) Hot pressing a sandwich of tungsten sheet–tungsten-coated spheres–tungsten sheet.
(5) Hot pressing a sandwich of tungsten powder–hot pressed panel–tungsten powder.

Among them, Methods No. 1 and No. 2, and particularly No. 4, are found to be suitable.

The brazing experiments according to the first method were performed using Coast Metals No. 62 brazing alloy (Mn–Ni–Co). The alloy was in the form of 0.002-inch sheet which was placed between the tungsten sheet and the composite panel. Brazing was performed at 1950° F. in helium for five minutes. The resulting braze joints were strong and metallography showed a good joint between the braze and the tungsten sheet and the tungsten coating. In many areas, the braze was observed to wet the alumina.

Two experiments were performed using Method No. 2. A layer of tungsten powder was placed at the bottom of the die cavity followed by several layers of tungsten-coated Al₂O₃ spheres and a top layer of tungsten powder. The pressing conditions used were 4200 p.s.i. and 2000° C. for the first pressing and 1666 p.s.i. and 1900° C. for the second pressing. The results of the first pressing were excellent. Not only were the coated spheres well bonded, but the tungsten powder had sintered and densified very well and a strong bond was formed. In the second pressing, the coated spheres had bonded, but the powdered tungsten layers were not satisfactorily sintered and densified at the conditions used. The chief problem associated with this technique is the sifting of the fine tungsten powder down into the loose layer of coated spheres. The result of this sifting is an increase of the tungsten metal volume of the core. This problem could be eliminated if a hot pressed core were used in place of the unpressed core, or if coarse tungsten particles were used in place of the fine powder. Two experiments were performed applying Method No. 4. A 0.020-inch thick sheet of tungsten was placed in the bottom of the die cavity followed by several layers of tungsten-coated Al₂O₃ spheres and a top sheet of tungsten. This sandwich was hot pressed in the first experiment at 1800 p.s.i. and 1600° C. for five minutes. The resulting compact consisted of a 58% of theoretical density core with both the top and bottom tungsten sheets well bonded to the core.

In the second experiment, a tungsten sheet–tungsten-coated sphere–tungsten sheet sandwich was hot pressed at 5000 p.s.i. and 1950° C. for three minutes. This resulted in a compact of 74% of theoretical density with again the tungsten clad being well bonded to the core structure.

I claim:
1. A composite lightweight refractory structure consisting essentially of a plurality of integrally bonded particles, each of which comprises a core of alumina or beryllia and a thin surface coating of tungsten the volume fraction of tungsten being less than about 0.20, and the surface coatings of said particles being diffusion bonded with a density of said structure above about 58% of the theoretical density.

2. A laminated composite lightweight refractory structure comprising (i) multiple layers of a plurality of integrally bonded particles of claim 1, each layer having a specific density, and being integrally bonded to form a laminated structure, and (ii) a metal clad integrally bonded to the laminated structure and covering at least a portion thereof.

References Cited

UNITED STATES PATENTS

| | | | |
|---|---|---|---|
| 3,088,892 | 5/1963 | Cain | 176—69 |
| 3,117,845 | 1/1964 | Reed | 29—182.3 X |
| 3,138,009 | 6/1964 | McCreight | 29—182.2 X |
| 3,305,325 | 2/1967 | Brasse | 29—182.3 |
| 3,343,953 | 9/1967 | Schladitz | 75—212 X |

FOREIGN PATENTS

| | | |
|---|---|---|
| 491,416 | 9/1938 | Great Britain. |
| 686,129 | 1/1953 | Great Britain. |
| 824,092 | 11/1959 | Great Britain. |

CARL D. QUARFORTH, Primary Examiner

A. J. STEINER, Assistant Examiner

U.S. Cl. X.R.

29—182.5; 75—208, 206, 212

PO-1050
(5/69)

UNITED STATES PATENT OFFICE
CERTIFICATE OF CORRECTION

Patent No. 3,519,405              Dated   July 7, 1970

Inventor(s)   Emanuel Gordon

It is certified that error appears in the above-identified patent and that said Letters Patent are hereby corrected as shown below:

In Table 3 at Columns 3 and 4 on lines 5-8, inclusive, in the column headed "$k_T$, cal./sec.-cm.-deg." the numbers "$_1$ 0.045
0.023                should read --  $_1$ 0.043
$_2$ 0.030                                           0.020
0.16 "                                    $_2$ 0.035
                                          0.016 --.

SIGNED AND
SEALED
OCT 20 1970

(SEAL)
Attest:

Edward M. Fletcher, Jr.
Attesting Officer

WILLIAM E. SCHUYLER, JR.
Commissioner of Patents

UNITED STATES PATENT OFFICE
CERTIFICATE OF CORRECTION

Patent No. 3,519,405        Dated July 7, 1970

Inventor(s) Emanuel Gordon

It is certified that error appears in the above-identified patent and that said Letters Patent are hereby corrected as shown below:

In Table 3 at Columns 3 and 4 on lines 5-8, inclusive, in the column headed "$k_T$, cal./sec.-cm.-deg." the numbers "$1\begin{matrix}0.045\\0.023\end{matrix}$    should read -- $1\begin{matrix}0.043\\0.020\end{matrix}$ $2\begin{matrix}0.030\\0.16\end{matrix}$ "            $2\begin{matrix}0.035\\0.016\end{matrix}$ --.

SIGNED AND SEALED
OCT 20 1970

(SEAL)
Attest:

Edward M. Fletcher, Jr.
Attesting Officer

WILLIAM E. SCHUYLER, JR.
Commissioner of Patents